US012795188B2

(12) United States Patent
Ensing

(10) Patent No.: US 12,795,188 B2
(45) **Date of Patent: *Nov. 10, 2026**

(54) SYSTEMS AND METHODS FOR PROVIDING MEDIA CONTENT FOR AN EXHIBIT OR DISPLAY

(71) Applicant: Maris Jacob Ensing, Orange, CA (US)

(72) Inventor: Maris Jacob Ensing, Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,593

(22) Filed: Dec. 16, 2024

(65) Prior Publication Data

US 2025/0119610 A1 Apr. 10, 2025

Related U.S. Application Data

(63) Continuation of application No. 17/859,756, filed on Jul. 7, 2022, now Pat. No. 12,170,806, which is a (Continued)

(51) Int. Cl.

| | |
|---|---|
| ***H04H 60/45*** | (2008.01) |
| ***G06V 40/16*** | (2022.01) |
| ***H04H 60/07*** | (2008.01) |
| ***H04H 60/33*** | (2008.01) |
| ***H04H 60/66*** | (2008.01) |
| ***H04N 21/422*** | (2011.01) |
| ***H04N 21/4223*** | (2011.01) |

(Continued)

(52) U.S. Cl.
CPC ...... *H04N 21/42202* (2013.01); *H04H 60/07* (2013.01); *H04H 60/33* (2013.01); *H04H 60/45* (2013.01); *H04H 60/66* (2013.01); *H04N 21/4223* (2013.01); *H04N 21/4415* (2013.01); *H04N 21/44218* (2013.01); *H04N 21/4532* (2013.01); *G06V 40/172* (2022.01)

(58) Field of Classification Search
CPC ......... H04N 21/42202; H04N 21/4223; H04N 21/4415; H04N 21/44218; H04N 21/4532; H04H 60/70; H04H 60/33; H04H 60/45; G06V 40/172
USPC .......................................................... 725/12
See application file for complete search history.

(56) References Cited

U.S. PATENT DOCUMENTS 4,769,697 A 9/1988 Gilley et al.
6,072,894 A 6/2000 Payne
(Continued)

FOREIGN PATENT DOCUMENTS

KR 20110137469 A 12/2011
KR 20160027576 A 3/2016
(Continued)

*Primary Examiner* — Alfonso Castro
(74) *Attorney, Agent, or Firm* — Shore IP Group, PLLC; Sean R. Wilsusen

(57) ABSTRACT

Systems and methods for providing media content to supplement an exhibit from an image of an audience for the exhibit include an image capture device proximate the exhibit that captures an image of the audience that includes the faces of audience members. A facial recognition process is used to identify each audience member, and certain audience characteristics are determined from the captured image. Stored information about the identified audience members and/or the audience characteristic information are used to determine the media content to provide to a playback device for playback while the exhibit is viewed by the audience.

20 Claims, 13 Drawing Sheets

Related U.S. Application Data continuation of application No. 16/036,625, filed on Jul. 16, 2018, now abandoned.

(51) Int. Cl.

*H04N 21/4415* (2011.01)
*H04N 21/442* (2011.01)
*H04N 21/45* (2011.01)

(56) References Cited

U.S. PATENT DOCUMENTS

| | | | | |
|---|---|---|---|---|
| 6,549,118 | B1 | 4/2003 | Seal et al. | |
| 7,024,180 | B2 | 4/2006 | Waters et al. | |
| 8,504,843 | B2 | 8/2013 | Tu | |
| 8,539,357 | B2 | 9/2013 | Hildreth | |
| 8,589,968 | B2 | 11/2013 | Alberth et al. | |
| 8,700,451 | B2 | 4/2014 | Jayakody | |
| 8,712,110 | B2 | 4/2014 | Eckhoff et al. | |
| 8,725,567 | B2 | 5/2014 | Huang et al. | |
| 8,791,787 | B2 | 7/2014 | Hardacker et al. | |
| 8,965,170 | B1 | 2/2015 | Benea et al. | |
| 9,363,155 | B1 | 6/2016 | Gravino et al. | |
| 9,575,558 | B2 | 2/2017 | Almen et al. | |
| 9,767,346 | B2 | 9/2017 | Govindara et al. | |
| 9,875,719 | B2 | 1/2018 | Eckhoff et al. | |
| 10,123,066 | B2 | 11/2018 | Zhang et al. | |
| 10,165,333 | B2 | 12/2018 | Patel et al. | |
| 10,484,818 | B1 | 11/2019 | Ensing | |
| 10,831,817 | B2 | 11/2020 | Ensing | |
| 2001/0031072 | A1 | 10/2001 | Dobashi et al. | |
| 2005/0225637 | A1 | 10/2005 | Eghbalian | |
| 2007/0005419 | A1* | 1/2007 | Horvitz | G06Q 30/02 701/533 |
| 2007/0024580 | A1 | 2/2007 | Sands et al. | |
| 2007/0271580 | A1 | 11/2007 | Tischer et al. | |
| 2007/0291998 | A1 | 12/2007 | Takizawa et al. | |
| 2008/0004951 | A1 | 1/2008 | Huang et al. | |
| 2009/0133051 | A1 | 5/2009 | Hildreth | |
| 2009/0217315 | A1 | 8/2009 | Malik et al. | |
| 2010/0071003 | A1 | 3/2010 | Bychkov et al. | |
| 2010/0177193 | A1 | 7/2010 | Flores | |
| 2011/0052012 | A1 | 3/2011 | Bambha et al. | |
| 2011/0072452 | A1* | 3/2011 | Shimy | H04N 21/44218 725/25 |
| 2012/0102409 | A1* | 4/2012 | Fan | H04W 4/00 715/738 |
| 2012/0174143 | A1 | 7/2012 | Yang et al. | |
| 2012/0304043 | A1 | 11/2012 | Shahraray et al. | |
| 2013/0061258 | A1 | 3/2013 | Takaya et al. | |
| 2013/0125154 | A1 | 5/2013 | Price et al. | |
| 2013/0194406 | A1 | 8/2013 | Liu et al. | |
| 2013/0219417 | A1 | 8/2013 | Gilson et al. | |
| 2013/0243260 | A1 | 9/2013 | Burry et al. | |
| 2013/0312018 | A1 | 11/2013 | Elliott et al. | |
| 2014/0140575 | A1 | 5/2014 | Wolf | |
| 2014/0164507 | A1* | 6/2014 | Tesch | H04L 51/10 709/204 |
| 2014/0168477 | A1 | 6/2014 | David | |
| 2014/0196067 | A1 | 7/2014 | Shaposhnik | |
| 2015/0070516 | A1* | 3/2015 | Shoemake | H04N 21/4542 348/207.11 |
| 2015/0150031 | A1 | 5/2015 | Gibbon et al. | |
| 2015/0160035 | A1 | 6/2015 | Longo et al. | |
| 2015/0271548 | A1 | 9/2015 | Daub | |
| 2015/0304727 | A1 | 10/2015 | Vandichalrajan et al. | |
| 2015/0319506 | A1 | 11/2015 | Kansara et al. | |
| 2016/0047890 | A1 | 2/2016 | Ryan et al. | |
| 2016/0110591 | A1 | 4/2016 | Smith et al. | |
| 2016/0140107 | A1 | 5/2016 | Cecchi et al. | |
| 2016/0343237 | A1 | 11/2016 | Herman et al. | |
| 2017/0095192 | A1* | 4/2017 | Sadowsky | A61B 5/0205 |
| 2017/0171613 | A1 | 6/2017 | Xu et al. | |
| 2017/0177923 | A1 | 6/2017 | Zheng et al. | |
| 2017/0214728 | A1 | 7/2017 | Chan et al. | |
| 2017/0228804 | A1 | 8/2017 | Soni et al. | |
| 2017/0289596 | A1* | 10/2017 | Krasadakis | H04W 4/021 |
| 2017/0295215 | A1 | 10/2017 | Syed | |
| 2017/0352256 | A1 | 12/2017 | Miwa | |
| 2018/0091854 | A1 | 3/2018 | Greenberger et al. | |
| 2018/0108040 | A1 | 4/2018 | Kim et al. | |
| 2018/0211187 | A1 | 7/2018 | Chen et al. | |
| 2018/0357667 | A1 | 12/2018 | Hall et al. | |
| 2018/0357981 | A1 | 12/2018 | Ng et al. | |
| 2019/0034710 | A1 | 1/2019 | Dickinson et al. | |

FOREIGN PATENT DOCUMENTS

| | | | |
|---|---|---|---|
| KR | 20170011862 | A | 2/2017 |
| WO | 2009067670 | A1 | 5/2009 |

* cited by examiner

SYSTEMS AND METHODS FOR PROVIDING MEDIA CONTENT FOR AN EXHIBIT OR DISPLAY

CROSS-REFERENCE TO RELATED APPLICATIONS

The present application is a continuation of U.S. patent application Ser. No. 17/859,756, filed Jul. 7, 2022, which is a continuation of U.S. patent application Ser. No. 16/036,625, filed Jul. 16, 2018, now abandoned. The disclosures of each of which are hereby incorporated by reference in their entirety.

FEDERALLY FUNDED RESEARCH OR DEVELOPMENT

Not Applicable

BACKGROUND

The present disclosure relates generally to public exhibits and more particularly to providing media content that supplements a public exhibit based on an image, image sequence, or video of an audience area for the exhibit captured by an image capture device.

There are many types of venues such as, for example, museums, galleries, theme parks, audience centers, and zoos that display exhibits for audiences from the general public. Often, to enhance the viewer experience, these venues will provide supplementary media content for the exhibit. For purposes of this discussion, media content is any type of content that may be sensed by an audience member during playback. Examples of types of media content include, but are not limited to, visual, audio, tactile, and any other form of media that may be sensed by an audience member during playback of the content to enhance the audience experience. The media content is often played back on a display, speakers, and/or other playback devices near the exhibit. Alternatively, the content may be provided to a personal device of an audience member when the audience member is near the exhibit.

One aspect of providing media content to supplement an exhibit is providing content that will be of interest and/or entertaining to the audience members. Each audience may be made up of various members that have different interests and needs. For example, an audience of school aged children may have shorter attention spans and less knowledge to enjoy an in depth discussion of the exhibit than an audience comprised of college educated adults. Furthermore, an audience of predominately non-English speaking members may not enjoy and/or understand media content in English. Furthermore, some audiences may have interests in different aspects of the exhibit. For example, an exhibit of important inventions may have both historical and technological aspects, and some audiences may prefer learning more about the historical aspects and some may be more interested in the technological aspects.

In addition, some audience members may have special needs that require special settings for playback of the content. For example, a person with some hearing disability may require audio content be played back at a higher volume and/or with a video component, such as closed captioning. A second example is that a person with visual disabilities may require video playback at a higher resolution, greater contrast, and/or different brightness to adequately view the content.

Furthermore, some exhibits may have an interactive component. As such, the provision of “buttons” and “sliders” on a touch screen may need to be adjusted based on the height and/or reach of an audience member to allow the member to use these features.

Also, an audience member may have certain time constraints. As such, the audience member may not have time for a lengthy display of media content and would prefer short pieces of content that touch upon only certain salient points about the exhibit.

Thus, those skilled in the art are constantly striving to provide systems and methods that provide media content that supplements an exhibit in meeting the needs of each particular audience.

SUMMARY

The above and other problems are solved and an advance in the art is made by systems and methods for providing media content for an exhibit in accordance with aspects of this disclosure. In accordance with some aspects of this disclosure, a system includes an image capture device operable to obtain an image of an audience area of the exhibit, a media content playback device, one or more processors; and memory in data communication with the one or more processors that stores instructions for the processor.

The one or more processors may receive the image of the audience area from the image capture device. The image of the audience area may be analyzed to generate current audience information. Media content information for media content to present based is determined by on the current audience information and provided to the media content playback device.

In accordance with many aspects, a sensor operable is to detect an audience member in the audience area and to transmit a proximity signal in response to the detection. The image capture device obtains the image in response to the proximity signal.

In accordance with aspects of the disclosure, a method for providing media content for an exhibit includes capturing an image of an audience area from an image capture device; performing, by a processor, facial recognition on the captured image to obtain facial recognition information; generating, by the processor, current audience information from the facial recognition information; identifying, by the processor, media content information for media content presentation based on the current audience information; providing, by the processor, the media content information to a media content playback device; and playing media content by the media content playback device based on the media content information.

In accordance with some aspects, the analyzing of the image of the audience area may include identifying each portion of the image that includes a facial image and performing facial recognition on each portion of the image that includes a facial image to determine an audience member associated with facial image.

In accordance with some of these aspects, the analyzing may also include obtaining audience information for each audience member associated with each portion of the image including a facial image and adding the audience information for each associated audience member to the current audience information.

In accordance with many of these aspects, the image of the audience area may be analyzed by performing behavioral recognition on each portion of the image including a facial image portion to determine demographic information for audience members in the audience area and the demographic information for each facial image portion is included in the current audience information.

In accordance with some aspects, the analysis of the image may include identifying each portion of the image that includes a facial image of one of the audience members, determining physical attribute information for each of the audience members from the portions of the image that include the facial images, and including the audience attribute information in the current audience information.

In accordance with many aspects, the determining of the media content may include determining the media content to provide to the media content playback device and determining playback parameters for use during the playback of the determined media content. An identifier of the determined media content and the playback parameters may be included in the playback information.

In accordance with a number of these aspects, the playback parameters may include one or more parameters selected from a group of parameters consisting of volume, resolution, contrast, brightness, and interface configuration.

In accordance with some aspects, the media content may include at least one of video media content and audio media content. In accordance with many aspects, the media content information includes an identifier of a file including the determined media content. In accordance with a number of aspects, the media content information may include source media content.

In accordance with some aspects, a second image of the audience area may be captured by the image capture device during the playback of the determined media content. The second image may be analyzed to generate a current audience information update. The determined media content may be modified based upon the current audience information update to generate media content update information. Media content update information may be to the media content playback device.

In accordance with aspects of the disclosure, apparatus for providing media content for an exhibit to a media content playback device associated with the exhibit includes a processor and memory readable by the processor that stores instructions that, when read by the processor, directs the processor to: capture an image of an audience area proximate the exhibit from an image capture device; perform facial recognition on the captured image to obtain facial recognition information; generate current audience information from the facial recognition information; identify media content information for media content presentation based on the current audience information; and provide the media content information to the media content playback device.

DETAILED DESCRIPTION

Systems and methods in accordance with various aspects of this disclosure provide media content to supplement an exhibit based upon an image captured of an audience viewing the exhibit. Such media content-providing systems and methods may also determine playback parameters for the media content based upon an image captured of an audience viewing the exhibit. In accordance with many aspects, a configuration of an interactive touchscreen or other input device may be modified based upon the captured image. In accordance with a number of these aspects, a subsequent image may be captured, and the media content and/or playback parameters are updated based upon the subsequent image.

A media content-providing system in accordance with this disclosure advantageously includes an exhibit control system, module, or functionality; a content control system, module, or functionality; and a facial recognition system, module, or functionality. The exhibit control function may advantageously be provided by a computer system that is connected to an image capture device (e.g., a camera) focused on an audience area near the exhibit, and one or more media playback devices. The computer system controls the camera to capture images of the audience area, and it provides the image to the content control system, module, or functionality. The computer system then receives media content information and obtains the media content. The media content is then played back by the playback devices. The media content information may include playback parameters for the media content, and the computer system may advantageously adjust the playback parameters based on information from the facial recognition system. The content control function may be performed by a computer system, a database storing media content associated with the exhibit, and a database that stores audience member information. The content control system or module receives the image from the exhibit control system or module and provides the image to the facial recognition module. The content control system or module then receives audience information from the facial recognition module and determines the media content and playback parameters that are sent to the exhibit control system or module. The facial recognition system or module receives the image of the audience area from the content control system or module, analyzes the image, and returns audience information to the content control system or module.

Figure 1:
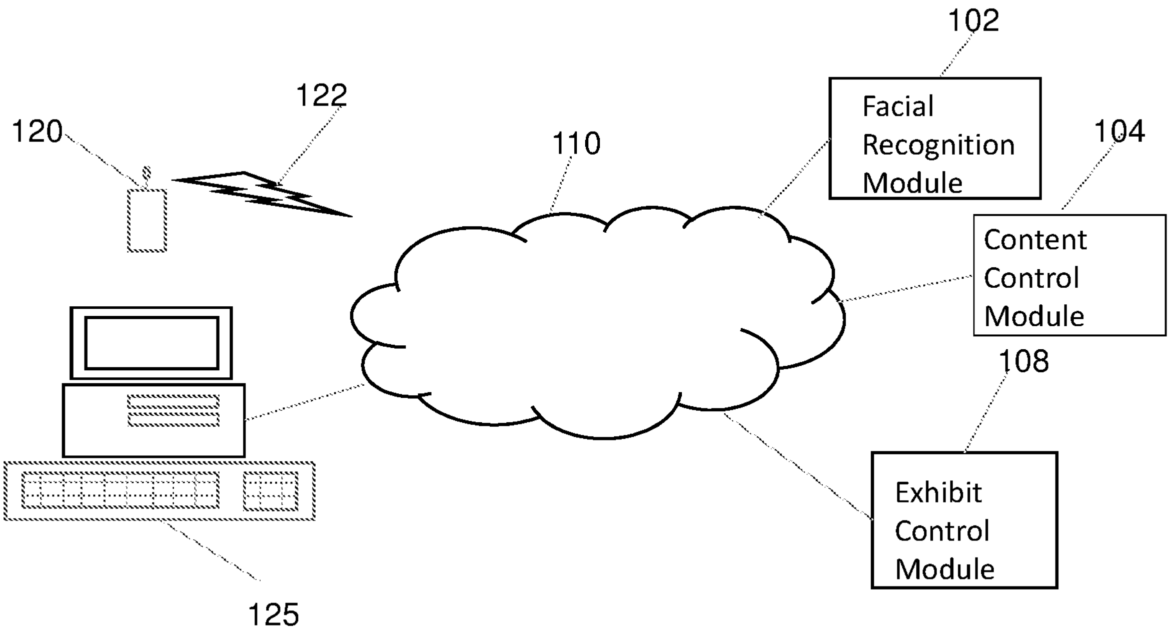
FIG. 1 is a diagrammatic representation of systems and devices that perform processes for providing media content to supplement an exhibit in accordance with aspects of the disclosure.

FIG. 1 illustrates a system 100 for providing media content to supplement an exhibit in accordance with an aspect of the disclosure. The system 100 includes a facial recognition module 102, a content control module 104, and exhibit control module 108 that are communicatively connected by a network 110. A portable personal communication device and a computer 125 may also be connected to the network 110. Although shown as three separate devices or functionalities in FIG. 1, the facial recognition module 102, the content control module 104, and the exhibit control module 108 may be provided by a single computing system. Alternatively, the processes that provide one or more of the facial recognition module 102, the content control module 104, and the exhibit control module 108 may be distributed across multiple systems that are communicatively connected via the network 110.

The facial recognition module, functionality, or system 102 may be implemented or functionalized by a computer system that includes a memory and a processing unit to perform the processes for providing facial recognition and/or other image analysis. The computer system that implements the facial recognition module, functionality, or system may include one or more servers, routers, computer systems, and/or memory systems that are communicatively connected via a network to provide facial recognition and/or other image analysis.

The content control module 104 may be implemented or functionalized by a computer system that includes a memory and a processing unit to perform processes for storing and providing media content for one or more exhibits in a venue. The content control module 104 may also advantageously store and update audience information for use in determining the media content to provide to an exhibit. The content control functionality may be provided by a central control system for the venue. Specifically, the content control module 104 may be implemented or functionalized by a system that includes one or more servers, routers, computer systems, and/or memory systems that are communicatively connected via a network to store and provide media content for one or more exhibits in the venue, as well as to store and update audience information for use in determining the content to provide to an exhibit.

The exhibit control module 108 may be implemented or functionalized by a computer system that controls devices in the exhibit area that include an image capture device and various playback devices for media content that supplements the exhibit. Advantageously, one computer system may control devices for more than one exhibit. In specific embodiments, the exhibit control module 108 may be implemented or functionalized by a system that includes one or more servers, routers, computer systems, memory systems, an image capture device and/or media playback devices that are communicatively connected via a local network to obtain and present media content for the exhibit.

The network 110 may advantageously be the Internet. Alternatively, the network 110 may be a Wide Area Network (WAN), a Local Area Network (LAN), or any combination of Internet, WAN, and LAN that can be used communicatively to connect the various devices and/or modules shown in FIG. 1.

The portable personal communication device 120 may a smart phone, tablet, Personal Digital Assistant (PDA), a laptop computer, or any other device that is connectable to the network 110 via wireless connection 122. The computer 125 may advantageously connect to the network 110 via either a conventional "wired" or a wireless connection. The computer 125 may be, for example, a desktop computer, a laptop, a smart television, and/or any other device that connects to the network 110. The portable personal communication device 120 and/or the computer 125 allow a user to interact with one or more of the above-described modules to provide information such as, for example, personal information to be added to audience member information of the user. In some embodiments, the portable personal communication device 120 or a media delivery system 128 may be used as the playback device of the supplemental media content for an exhibit.

Although a particular system of devices and/or functional modules is described above with respect to FIG. 1, other system architectures that, add, remove, and/or combine various devices and/or modules may be used to perform various processes in accordance with various other aspects of the disclosure.

Figure 2:
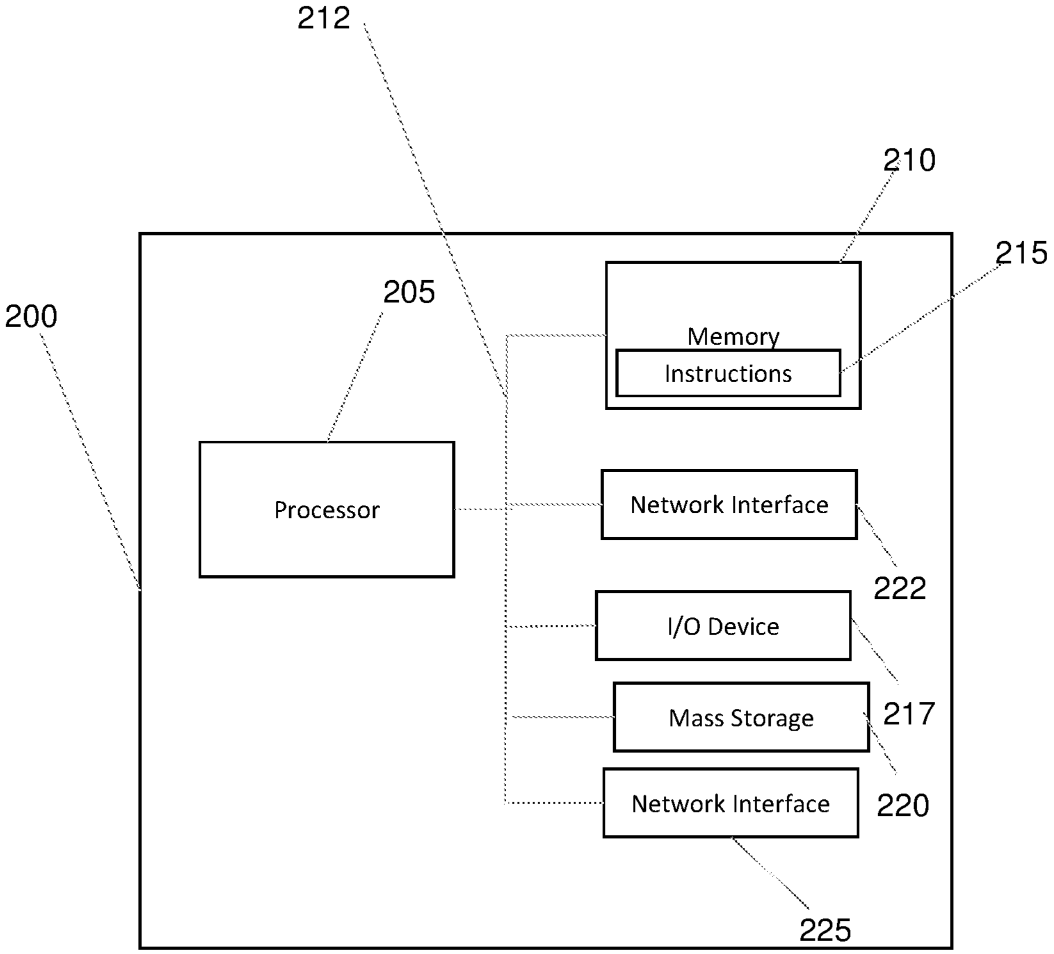
FIG. 2 is a block diagram of a computer processing system in a component in accordance with an aspect of the disclosure.

FIG. 2 is a high-level block diagram showing an example of the architecture of a processing system 200 that may be used according to some aspects of the disclosure. The processing system 200 can represent a computer system that provides a facial recognition functionality, a content control functionality, an exhibit control functionality, and/or other components or functionalities. Certain standard and well-known components of a processing system which are not germane to the subject matter of this disclosure are not shown in FIG. 2.

Processing system 200 includes one or more processors 205 in operative communication with memory 210 and coupled to a bus system 212. The bus system 212, as shown in FIG. 2, is a schematic representation of any one or more separate physical buses and/or point-to-point connections, connected by appropriate bridges, adapters and/or controllers. The bus system 212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The one or more processors 205 are the central processing units (CPUs) of the processing system 200 and, thus, control its overall operation. In certain aspects, the one or more processors 205 accomplish this by executing software stored in memory 210. The processor(s) 205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 210 represents any form of random access memory (RAM), read-only memory (ROM), flash memory, or the like, or a combination of such devices. Memory 210 includes the main memory of the processing system 200. Instructions 215 implementing the process steps of described below may reside in memory 210 and are executed by the processor(s) 205 from memory 210.

Also advantageously connected operatively to the processor(s) 205 through the bus system 212 are one or more internal or external mass storage devices 220, and a network interface 222. The mass storage device(s) 220 may be, or may include, any conventional medium for storing large volumes of data in a non-volatile manner, such as one or more solid state, magnetic, or optical based disks. The network interface 222 provides the processing system 200 with the ability to communicate with remote devices (e.g., storage servers) over a network, and may be, for example, an Ethernet adapter, a Fiber Channel adapter, or the like.

The processing system 200 also advantageously includes one or more input/output (I/O) devices 217 operatively coupled to the bus system 212. The I/O devices 217 may include, for example, a display device, a keyboard, a mouse, etc.

Figure 3:
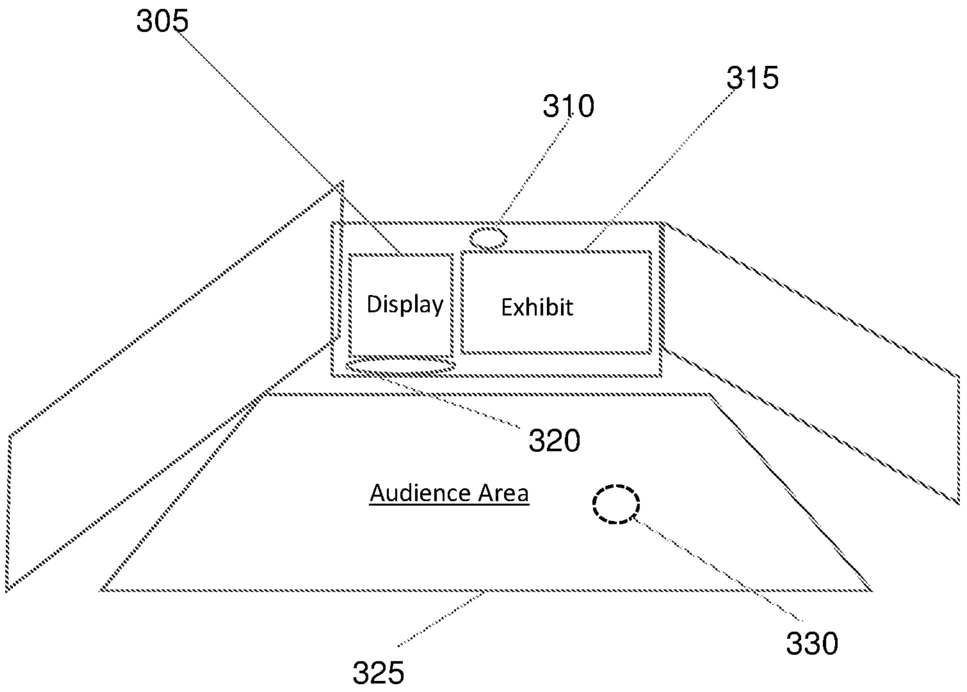
FIG. 3 is conceptual perspective view of a room with an exhibit including playback devices to provide supplemental media content accordance with an aspect of the disclosure.

FIG. 3 illustrates an exhibit display area in accordance with an aspect of the invention. As shown in FIG. 3, an exhibit 315 is located in a room. For example, the exhibit 315 may be mounted on a wall of a room (as shown), placed on the floor, or hanging from the ceiling. Alternatively, the exhibit 315 may be a stage or other raised platform where performances by actors, artists, musicians, or others may be staged.

To provide supplemental media content, one or more media playback devices may be provided to present the supplemental media content to an audience. For example, a personal device, such as a smart phone, tablet, or other media playback device may be carried or worn by one or more audience members and/or exhibit staff members. The personal devices may communicate with the exhibit control module via a wireless connection, either directly to the exhibit control module, or through a network connection in accordance with various aspects to obtain and/or present the supplemental media content.

In FIG. 3, the playback devices are shown as a display 305 and speakers 320. The display 305 may be a monitor or other video playback device that is located proximate the exhibit 315 to display video content of the supplemental media content for the exhibit 315. Speakers 320 are auditory playback devices that may advantageously be mounted to the wall, or standing proximate the wall, under the display 305 and that play back auditory content in the supplemental media content. In general, the display 305, speakers 320, and/or other playback devices may be located or mounted anywhere proximate the exhibit 315, and they are advantageously placed to provide sufficient coverage of an audience area 325 to allow the desired number of audience members to view, hear, and/or in some other way sense the presentation of the media content.

An audience area 325 is defined proximate the exhibit 315. In FIG. 3, the audience area 325 is the floor in front of the exhibit 315; however, the audience area 325 may be any defined area where an audience may be expected to stand, sit, or otherwise view the exhibit. For example, the audience area 325 may be benches or seats in front of the exhibit 315. In some embodiments, a sensor 330 such as, but not limited to, a pressure sensor, a motion detector, or any other type of sensor that senses the presence of at least one audience member is located in or near to audience area 325.

An image capture device 310, such as, for example, a camera, is located proximate the exhibit 315, e.g., in the wall, and it is focused on audience area 325. The image capture device 310 captures still images and/or video images of the audience as the audience views the display 305 and/or the exhibit 315. Although shown as wall-mounted proximate the exhibit 315, the image capture device 310 may be placed anywhere in the area of the exhibit 315 that will allow the device to capture an image with facial images of at least a portion, if not all, of the audience members that are in and/or proximate to the audience area 325.

Although an exemplary exhibit area in accordance with an aspect of the invention is described above with reference to FIG. 3, other configurations that add, remove, combine, and/or move components relative to one another are possible.

Figure 4:
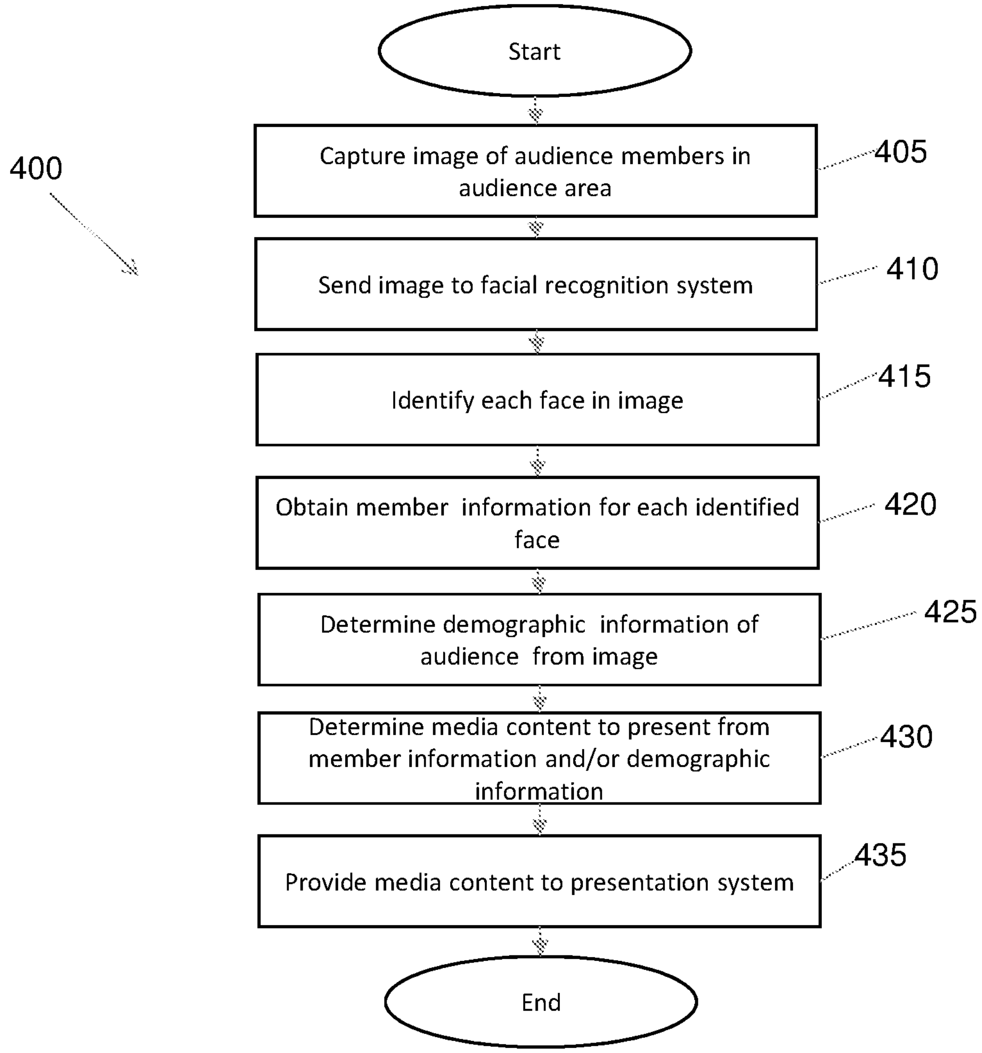
FIG. 4 is a flow diagram of a process for providing supplemental media content for an exhibit based upon an image of an audience area of the exhibit in accordance with an aspect of the disclosure.

FIG. 4 illustrates a flow diagram of a process for providing supplemental media content for an exhibit in accordance with an aspect of the invention. The process 400 captures an image of audience members in an audience area proximate the exhibit (405). The captured image may advantageously be provided to a facial recognition device or module (410). The facial recognition device or module identifies the desired portions of the captured image of the audience area that include the facial image of one or more audience members (415).

A facial recognition process is then performed on each identified portion of the captured image to identify (e.g., with appropriate user information) each audience member (420). Demographic information and, optionally, other audience-related information for the audience as whole may also be determined or obtained by the facial recognition device or module (425). The media content to present to the audience is then determined based on the audience members identified from the portions of the images that include a face and/or from the determined demographic information for the audience (430). In accordance with some aspects, playback parameters for each piece of media content to be provided may also be determined. The media content and/or playback parameters are provided to the exhibit control device or module for playback using the media playback devices (435), after which the process 400 ends.

The above describes an overall process for providing media content to supplement an exhibit in accordance with one aspect of the disclosure. However, other processes that add, combine, remove, and/or reorder the steps of the process are possible.

Figure 5:
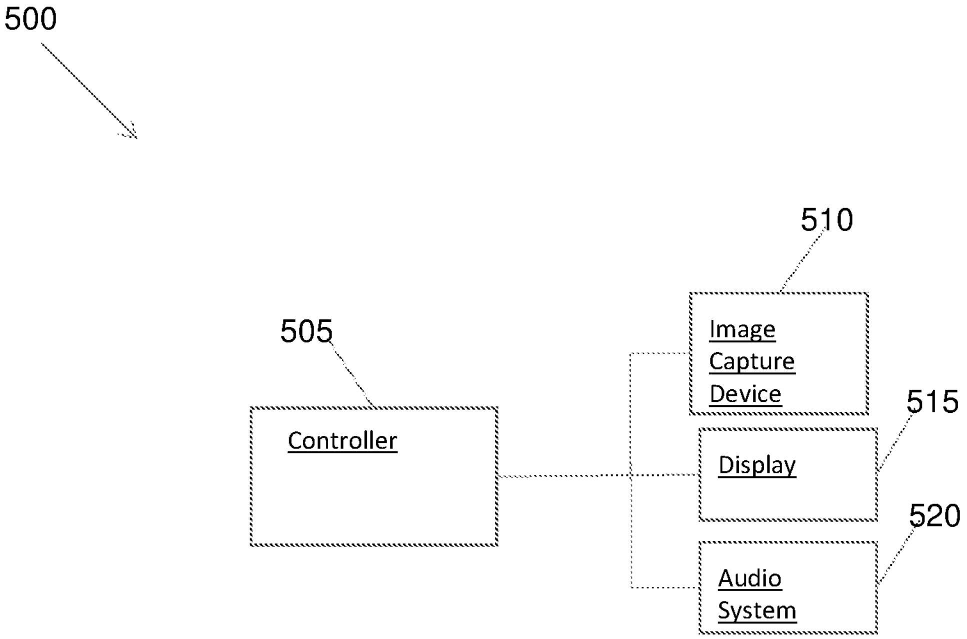
FIG. 5 is a block diagram of components of an exhibit control system in accordance with an aspect of the disclosure.

As discussed above, an exhibit control device or module captures the images of the audience and plays back the media content that is selected based upon the captured image. FIG. 5 is a block diagram of the components of an exhibit control device or module 500 which, in accordance with an aspect of the disclosure, includes a controller 505, an image capture device 510, a display 515, and an audio system 520.

The controller 505 may be implemented as a processing system that controls the image capture device 510 in capturing images of the audience area to obtain the media content information provided based upon analysis of the captured image. In accordance with some aspects, the controller 505 may also control one or more components of the exhibit. These components may include, for example, valves, hydraulic lifts, animatronics that provide motion in the exhibit, and any other components that receive instructions to perform a task to facilitate the presentation of the exhibit. In some other aspects, the control system for more than one exhibit may be provided by a processing system.

The image capture device 510 may be a camera that captures still images and/or a video camera that captures video images. In the exemplary embodiment shown in FIG.

5, the image capture device 510 is a separate device including a processing system that is communicatively connected to the controller 505 via a wireless or wired connection. In some other aspects, the image capture device 510 is an I/O device of the processing system or module including the controller 505. As discussed above, the image capture device 510 is positioned such that the device is focused on the audience area in a manner to capture images that include facial images of the audience. The image capture device 510 may also capture, record, or otherwise provide other information, such as depth information for the imaged image objects.

The display 515 is communicatively connected to the controller 505. The display 515 may, in some embodiments, be a monitor that is controlled by the processing system of the controller 505. In accordance with some other aspects, the display 515 may be one or more signs that are lighted by a lighting element that is controlled by the controller 505. Alternatively, the display 515 may be a touch screen that allows interaction with an audience member.

The audio system 520 may include one or more speakers that are placed around the exhibit and/or audience area, and it may further include a processing system communicatively connected to the controller 505. In some embodiments, the audio system may include an audio transducer configured as an I/O device of the controller 505.

Although an exemplary embodiment of an exhibit control device or module is described above with respect to FIG. 5, other embodiments that add, combine, rearrange, and/or remove components are possible.

Figure 6:
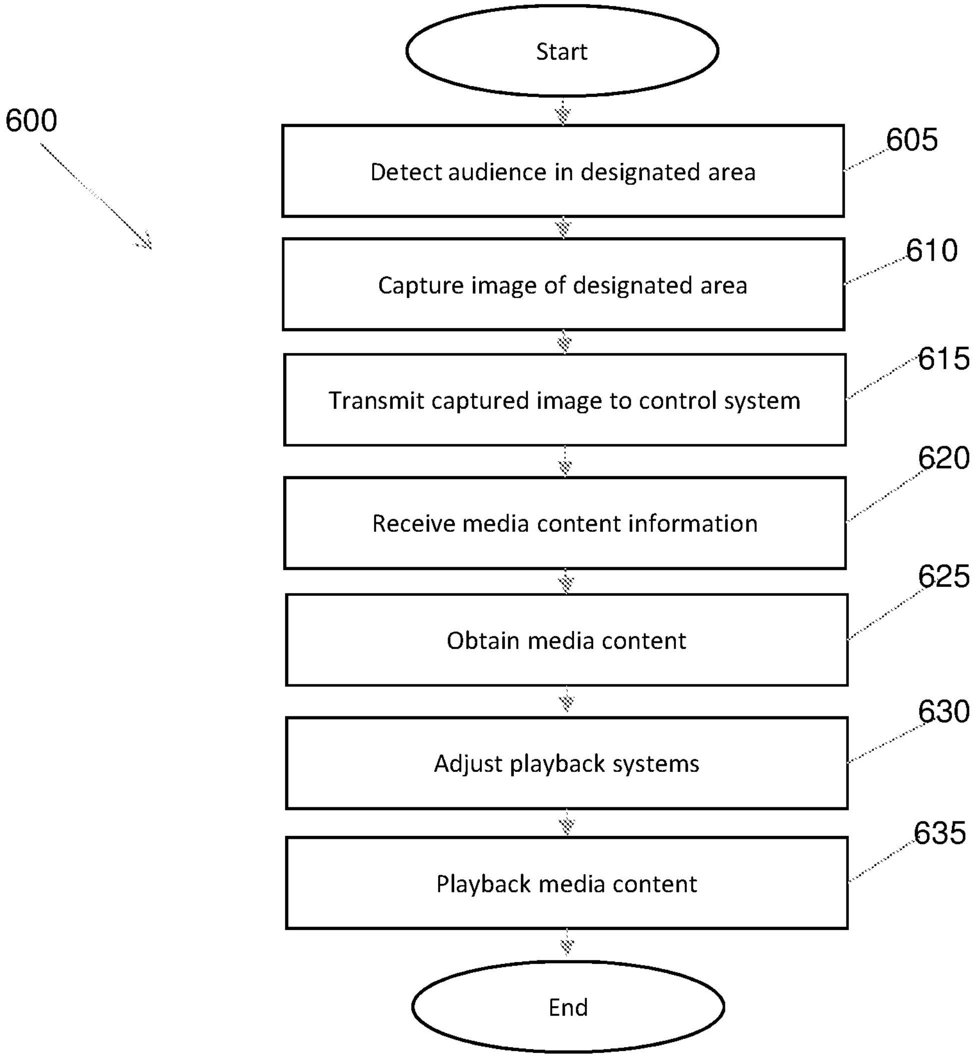
FIG. 6 is a flow diagram of a process performed by the exhibit control system to obtain and playback supplemental media content in accordance with an aspect of the disclosure.

FIG. 6 illustrates a flow diagram of a process 600 performed by the exhibit control device or module to provide supplemental media content in accordance with an aspect of this disclosure. In the process 600, an audience is detected in the audience area (605) by, for example, motion sensors, heat sensors, and/or any other type of sensor that may detect the presence of one or more audience members in the audience area.

An image is captured of the audience area (610), for example, in response to the detection of one or more audience members in the audience area. Alternatively, the image capture device may periodically capture an image at pre-defined intervals of time, or a video feed of the audience area may be continuously captured.

The captured image is transmitted to a content control device or module (615), optionally with other information about the image. Such other image information may include, for example, camera settings, depth information, lighting information, and/or other like information related to the image. The image information may be transmitted separately, or it may be transmitted in or with the captured image. Optionally, a video feed may be provided to the content control device or module. The exhibit control device or module may optionally monitor a video feed and only send an image that includes audience members that is taken from the feed when an audience is detected in the audience area. The exhibit control device or module may optionally perform image processing to improve image quality prior to transmitting the image, and/or it may optionally isolate facial images from the captured image and send only portions of the image that include facial images to the content control device or module.

The exhibit control device or module receives media content information (620) to supplement the exhibit that is determined based upon the captured image, as discussed further below. The media content information advantageously includes the media content to present, and it may also include identifiers, such as, for example, internet addresses, file directory identifiers, or other identifiers that may be used to obtain the media content and/or stream the content from an identified content provider. The video content information may optionally include playback parameters for adjusting the parameters of the playback devices to provide the desired playback. For example, the media content information, may include brightness, contrast, resolution or other information for video playback, and/or it may include volume and/or balance information for an audio playback.

The media content is then obtained (625), e.g., by being read from memory in the exhibit control device or module, and/or by being received from one or more specific media content storage systems. The media content may optionally be streamed using adaptive bit rate streaming or some other streaming technique from a content provider.

The playback parameters of the individual playback devices may then be adjusted based on the received media content information (630), and the media content is then presented by the playback devices (635), at which point the process 600 may end. However, in some embodiments, the process may be periodically repeated during playback to update the media content being presented to account for the composition of the audience changing as audience members arrive and depart during the playback.

Although an exemplary process performed by the exhibit control device or module to provide media content to supplement an exhibit in accordance with aspects of this disclosure is discussed above with respect to FIG. 6, other processes performed by the exhibit control device or module to provide the media content that add to, combine, rearrange, or remove any of the described steps are possible and are considered within the scope of this disclosure.

Figure 7:
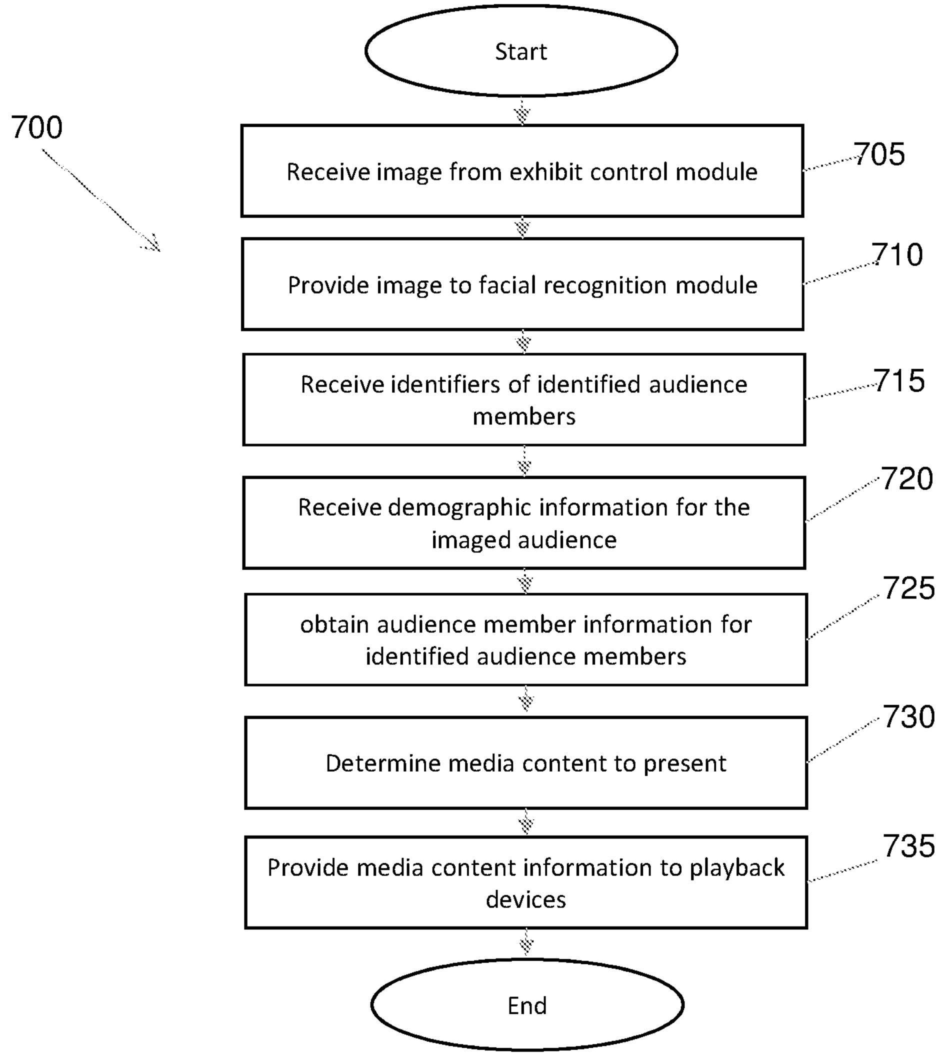
FIG. 7 is a flow diagram of a process performed by a content control system to provide supplemental media content to an exhibit in accordance with an aspect of the disclosure.

FIG. 7 illustrates a flow diagram of a process performed by the content control device or module to determine the media content to provide to the exhibit control device or module, based upon the captured image. A process 700 may be performed for each image received. Thus, the process 700 may be performed once to determine the media content to present at one time in accordance, or, alternatively, the process 700 may be periodically performed during the presentation of media content to update the media content being presented to account for changes in the audience of the exhibit over time.

In the process 700, a captured image of the audience area is received from an exhibit control device or module (705). As discussed above, addition image information may optionally be received with the image. The image is then provided to a facial recognition device or module for image analysis (710). The content control device or module may do some image processing prior to providing the image to the facial recognition device or module. The analysis may include, for example, isolating facial images in the image, modifying the image to improve image quality, and/or analyzing the image to determine or obtain other image information. In some embodiments, such other image information may be provided by the captured image to the facial recognition system.

The process 700 receives identifiers of audience members identified in the captured image (715). The identifiers may be from audience information that the content control device or module, or some other system, device or module, has previously provided to the facial recognition system as discussed further below. In some aspects, the identifiers may be provided in a list of audience members identified. Demographic information for the audience may also be received (720). The demographic information is information about the characteristics of the audience that the facial recognition device or module generates during analysis of the image. The demographic information may be in the form of a list for each audience member, or it may be in the form of a total for each particular characteristic. The demographic information may include, for example, the ages, nationalities, races, heights, and/or genders of the people in the audience. Other audience information may optionally be provided, such as the general emotional state of the audience even of individual audience members.

The content provider device or module then obtains the audience member information associated with each identifier received (725). The audience member information may be information about the identified audience member stored by the content provider device or module that provides insight into the interests and requirements of the particular audience member, thereby indicating the media content that will be of interest to the member.

Figure 8:
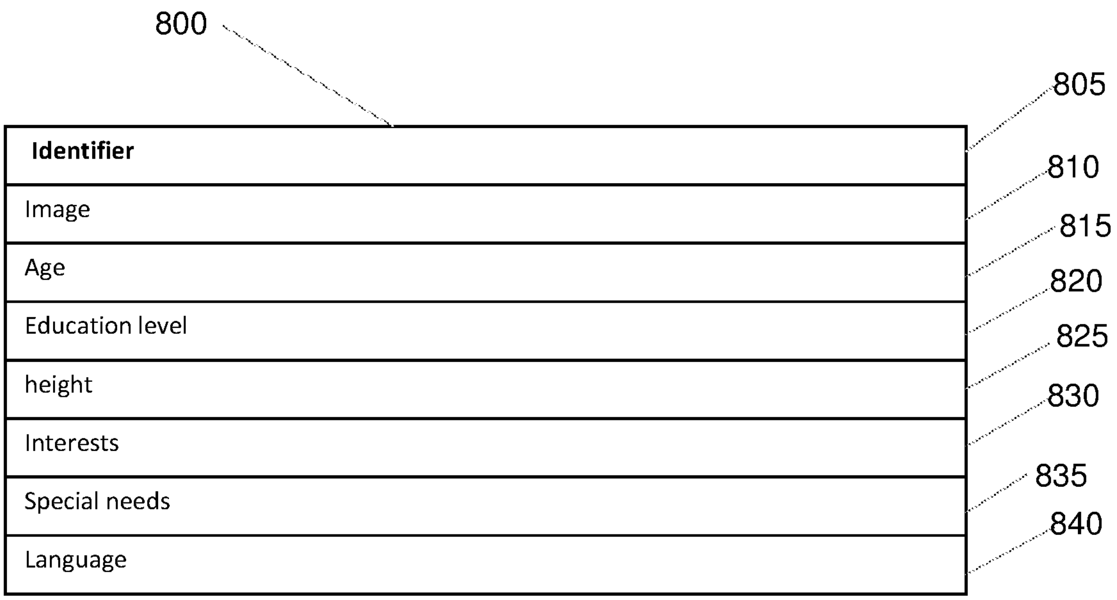
FIG. 8 is conceptual diagram of a data record for an audience member stored by the content control system for using in determining the proper media content to provide in accordance with an aspect of the disclosure.

FIG. 8 illustrates an example of an audience member record maintained by the content provider device or module in accordance with an aspect of this disclosure. The audience member record 800 advantageously includes an identifier 805, such as a name or member number for the audience member. The record 800 also includes a facial image 810 of the member that the audience member, either provided to the content provider device or module, or captured from the audience member during a registration process. The record 800 also includes fields for particular information about the audience member that may be used to determine media content that may be of the most interest to the audience member. The fields in the record 800 may advantageously include a field for the member's age 815, the member's education level 820, the member's height 825, the member's particular interests 830, any special needs of the member 835, and the primary language used by the member 840. Examples of particular interests may include, for example, areas of study such as science and history that the member is interested in understanding. Examples of special needs may include, for example, any visual, audio aids that the user may need to perceive the media content, and requirements, such as specially accessible inputs that a member may need to interact with the media content owing to a physical limitation. Each record may optionally include other fields and/or subfields that define particular categories in these fields that may be used to determine the proper media content to provide and/or presentation requirements that may be needed by the playback device for the member to best experience the content.

Returning to the process 700 shown in FIG. 7, the process 700 uses the audience member information of each identified audience member and/or the demographic information to determine the media content to present to supplement the exhibit (730). In situations in which the media content is to be played back by the personal devices of audience members, the process 700 may use only the member information of a particular member to determine the media content to provide to that member. In some embodiments, the demographic information will be used to determine the content to provide even if there is no specific audience member record for the identified audience member.

In accordance with some aspects, the member and/or demographic information may be applied to an algorithm that then determines the media content that will be of most interest to the broadest range of audience members. The algorithm, for example, may be an artificial intelligence algorithm, such as, for example, a neural network algorithm that takes at least a portion of the audience member and/or demographic information available and selects the media content available for the exhibit that will appeal to the greatest number of audience members. For example, the algorithm may choose an audio presentation in a language that is used by the greatest number of identified audience members, or a language determined by the greatest number of a particular nationality identified in the demographic information. The algorithm may then select a closed caption track for the language used by the second greatest number of audience members.

The subjects covered by the media content provided may be determined to appeal to the greatest number of audience members in accordance with some aspects. For example, the algorithm may determine that most of the audience is comprised of members interested in the scientific aspect of the exhibit as opposed to the historical aspect. As such, the algorithm selects video and audio media content directed to the scientific aspects of the exhibit. The algorithm may also consider the age of the audience members in selecting the content. For example, the algorithm may select content directed to younger students if the average age of the audience is younger, and more mature content if the audience average age is determined to be in the adult range.

Furthermore, the algorithm may weight some of the audience member information based upon quality of service parameters. For example, some audience members may have bought a subscription to a service that entitles them to have preferential treatment over other audience members. As such, the information for these members may be given added weight in the algorithm when determining the content to provide.

In accordance with some aspects, the algorithm may give more or less weight to the information of the identified members than to the demographic information of the entire audience. Alternatively, the algorithm may give more weight to the demographic information to try to appeal to the greatest number of audience members.

In accordance with some aspects, the special needs of an audience member may include a time allocation to spend at a particular exhibit or at the venue as a whole. As such, the algorithm may use this time allocation information to select media content that has a playback time that conforms to the time allocation requirements of one or more audience members. In some of these aspects, the media content may also include suggestions guiding the audience member(s) to other exhibits in order to guide the member through the venue in the allocated time and/or see the exhibits that most interest the member(s).

Once the algorithm has determined the media content to provide and/or the playback parameters that meet the needs of the audience, the media content information and/or playback information is generated and provided to the exhibit control device or module (735), at which point the process 700 may end. As discussed above, the process 700 may be periodically repeated to update the media information and/or playback parameters to account for the changing composition of the audience.

An exemplary process for selecting the media content to supplement an exhibit performed by a content control device or module in accordance with an embodiment of the disclosure is described above with reference to FIG. 7. However, other processes for selecting the media content that add, combine, rearrange, and/or remove one or more steps described above are possible in accordance with other embodiments.

The analysis of the captured image of the audience area is performed by a facial recognition system (i.e., device or module) in accordance with various aspects of the disclosure. In order to perform facial recognition, the facial recognition device or module needs facial images of the audience members to perform comparisons. In accordance with some aspects of the disclosure, the facial image of a member is provided by the audience member and/or captured by the system during a registration process used to generate an audience member record, such as the record described above with respect to FIG. 8. The registration process may be performed by a central control system or the content control device or module in accordance with various aspects of this disclosure. The facial image and an identifier of the audience member is then provided by the registration process to the facial recognition device or module.

Figure 13:
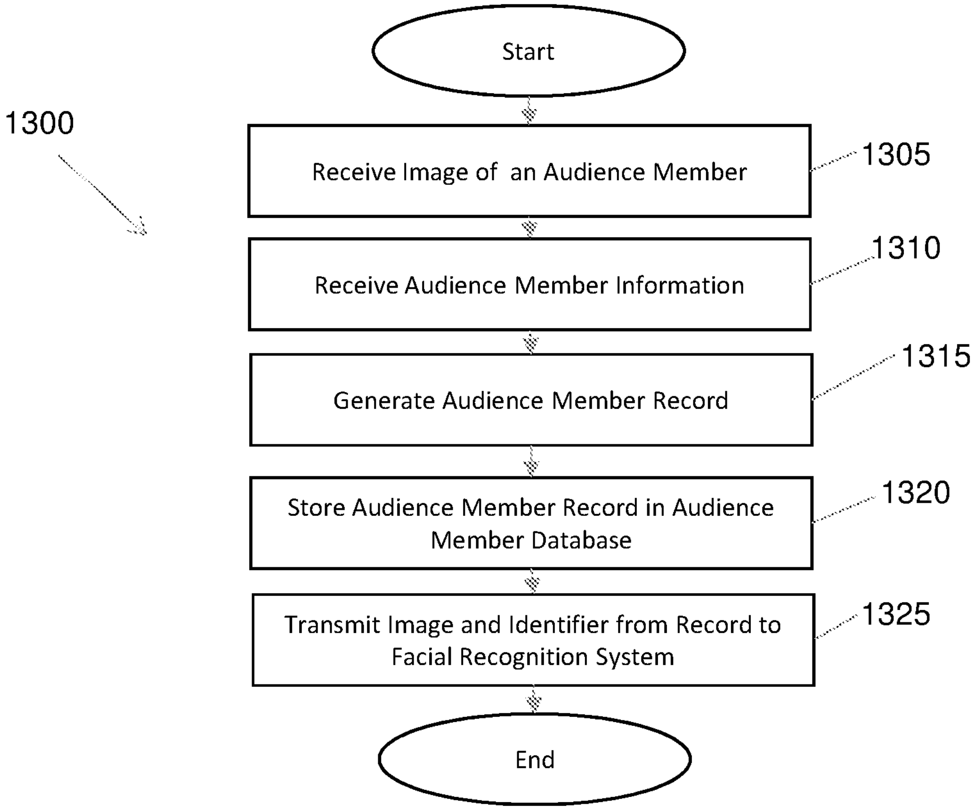
FIG. 13 is a flow diagram of a process performed by a content control system to obtain audience member information and generate an audience member record in accordance with an aspect of this disclosure.

FIG. 13 illustrates a flow diagram of registration process performed by a central control system or the content control device or module in accordance with an aspect of this disclosure. In the registration process 1300, a facial image of the audience member that is registering with the system is received (1305). For example, the audience member may provide a facial image stored on the user device that audience member is using to register. In that situation, the process 1300 may issue a command (for example, by a wireless communication) that directs the user device to capture the facial image using an image capture device associated with the user device, and to provide the image to process 1300. The process 1300 may also receive audience member information for the member (1310). In accordance with some aspects, the registering member may input the information to a personal device that provides the information to the process 1300. The audience member information may include at least a portion of the information discussed above with reference to FIG. 8. However, the information may also include any information that may be needed to select media content using a particular algorithm.

An audience member record that includes the received audience member information and the captured facial image is generated (1315) and stored in an audience member database (1320). The captured facial image and an identifier of the audience member is provided to the facial recognition device or model (1325), and the process 1300 may then end.

An exemplary process for registering an audience member in accordance with embodiments of the disclosure is described above with respect to FIG. 13. Other registration processes that add, combine, rearrange, and/or remove one or more steps described above are possible in accordance with other embodiments.

Figure 9:
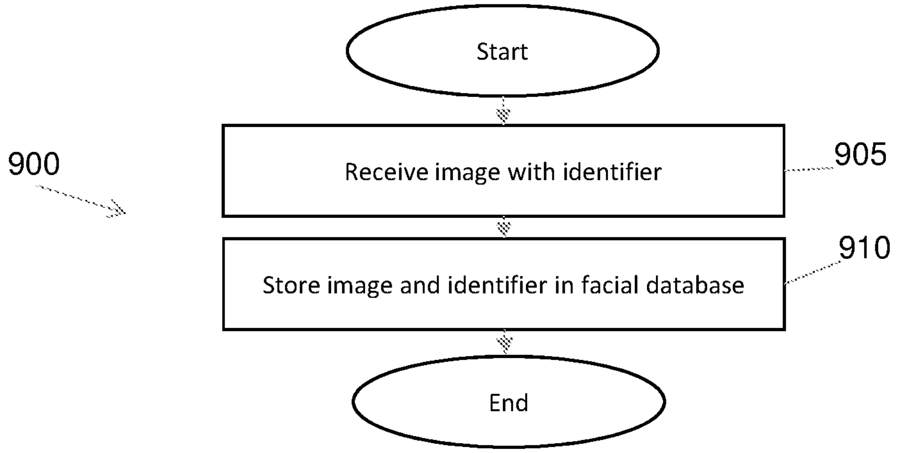
FIG. 9 is a flow diagram of a process performed by a facial recognition system to store data records of images of audience members in accordance with an aspect of the disclosure.

FIG. 9 illustrates a process performed by the facial recognition device or module in response to receiving a facial image and identifier of an audience member in accordance with embodiments of this disclosure. In the process 900, the facial recognition device or module receives a facial image and identifier of an audience member from a central control system or content control device or module (905). A facial recognition record is generated and stored (910). The generation of the facial recognition record may include, for example, performing analysis of the image to generate facial parameters that may be used for image comparisons during the facial recognition process, as discussed further below.

An exemplary process for obtaining audience member facial images in a facial recognition system accordance with embodiments of the disclosure is described above with respect to FIG. 9. Other processes for obtaining facial images that add, combine, rearrange, and/or omit one or more steps described above are possible in accordance with other embodiments.

Figure 11:
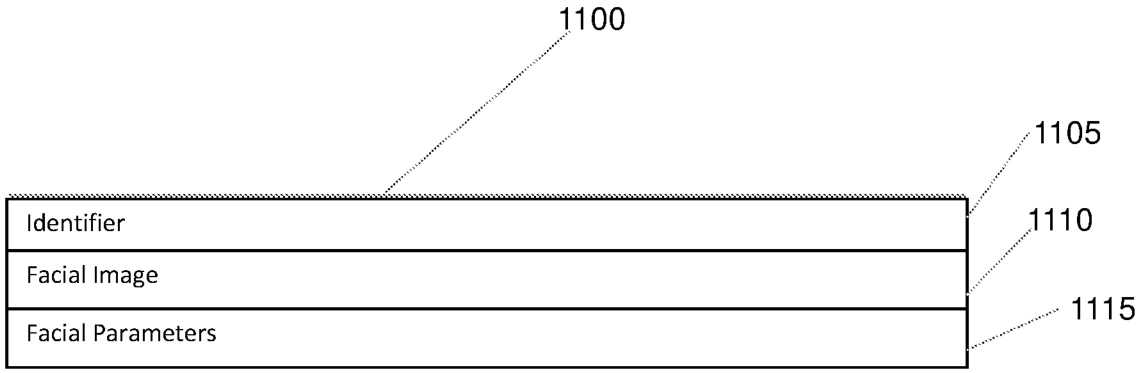
FIG. 11 is a conceptual drawing of a facial image record maintained by facial recognition system in accordance with an aspect of the disclosure.

FIG. 11 is a conceptual data structure for a facial recognition record in accordance with an aspect of the disclosure. A facial recognition record 1100 includes an identifier of the audience member 1105, the received facial image 1110, and the facial parameters for facial recognition comparisons 1115. The identifier may be, for example, a name and/or nickname of the audience member, or the identifier may be a number or alphanumeric string that associates the image to a specific audience member record stored by the content control device or module and/or the central control system.

Although an exemplary facial recognition record in accordance with embodiments of the disclosure is described above with reference to FIG. 11, other facial recognition records that add, combine, rearrange, and/or omit information are possible in accordance with other embodiments.

Figure 10:
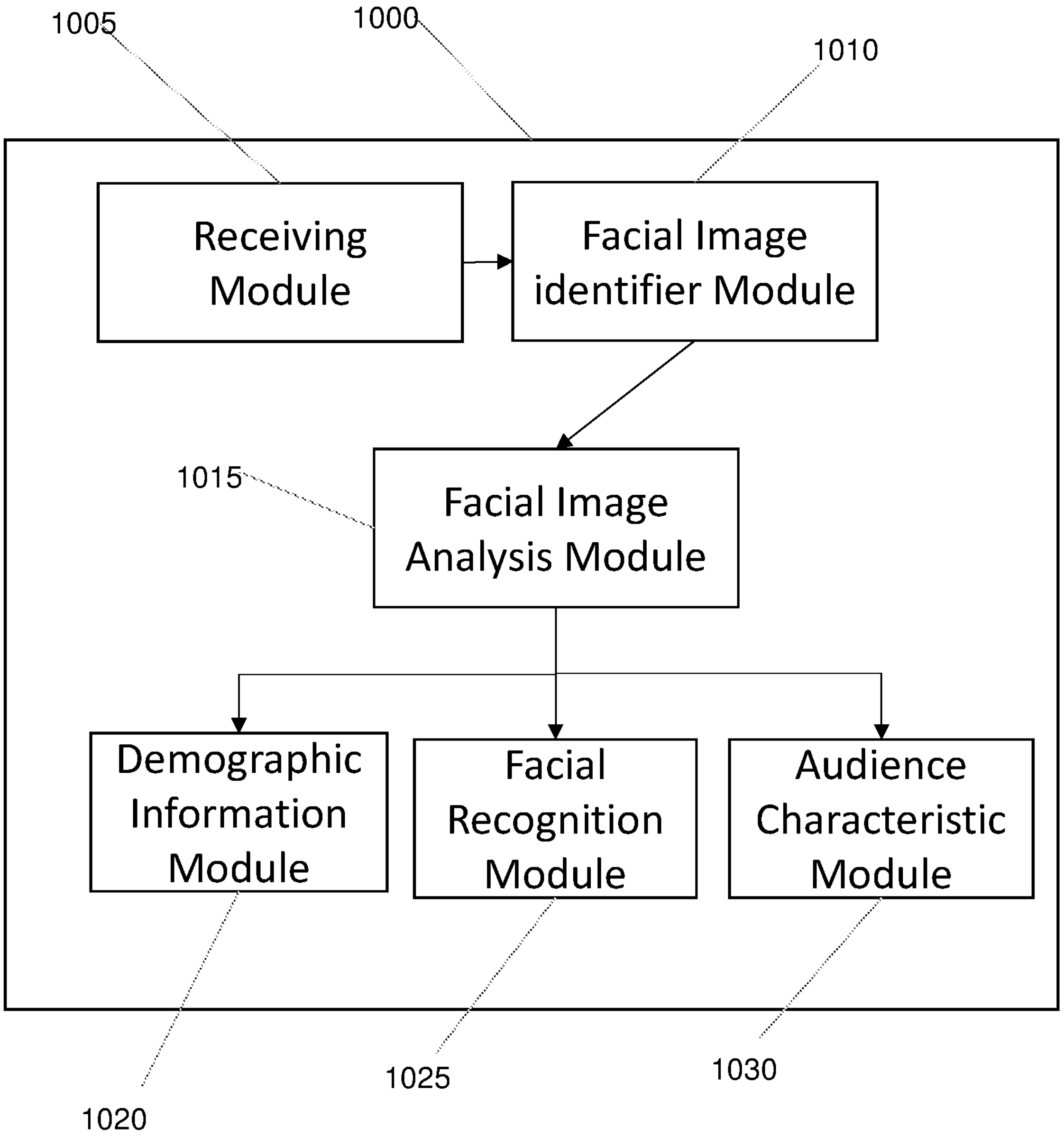
FIG. 10 is a conceptual diagram of the modules of software for performing facial recognition analysis on a captured image of an audience area in accordance with an aspect of the disclosure.

The software and/or hardware modules that perform a facial recognition process in accordance with embodiments of the disclosure is shown in FIG. 10. The facial recognition system 1000 includes a receiving module 1005, a facial image identifier module 1010, a facial image analysis module 1015, a demographic information module 1020 that may generate other information (particularly demographic information), a facial recognition module 1025, and an audience characteristic module 1030.

The receiving module 1005 receives a captured image and processes the captured image to conform the image to the parameters needed to perform the various subsequent processes for facial recognition analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 1005 uses the image information in the image processing to conform the image to the required standards.

The processed image is provided to the facial image identifier module 1010, which identifies the portions of the image that include a facial image. The identification may use edge detection and other various search processes to identify those portions of the image that include an image of a face to which facial recognition may be applied. In accordance with some aspects, the facial image identifier may also perform some image processing to conform the portions including a facial image to the requirements of an analysis module.

The facial image analysis module 1015 receives the portions of the image that include a facial image and performs analysis on each image to generate the data needed by the other modules to generate the information required. For example, the image analysis module may generate pixel color and vector data needed to perform edge detection, color detection, and the like needed to perform the various subsequent processes. In accordance with some aspects, the facial image analysis module 1015 also receives the image information and/or a complete image for use in performing the analysis. The information generated by the facial image analysis module 1015 is provided to the information module 1020, the facial recognition module 1025, and the audience characteristic module 1030 for using in performing the facial recognition and to generate the demographic and audience characteristic information.

The demographic information module 1020 uses the information for each facial image received from the facial image analysis module to generate demographic information for the entire audience, or at least a substantial portion of the audience (e.g., a representative sample). The demographic information may include, for example, the ages, nationalities, races, and the like of the audience members. The demographic information may also optionally include a statistical analysis of the categories to provide the mean, medium, and other information for each category.

The facial recognition module 1025 receives the information for each facial image and compares the information of each facial image to the information for the facial images in each facial recognition record to determine a match and returns the identifier of each record that matches one of the facial images from the captured image to a predefined degree of confidence. To facilitate the comparison, the records may include facial image data that is precomputed to provide quicker comparisons by eliminating the need to analyze each reference image.

The audience characteristic module 1030 receives the information for each facial image and compiles audience characteristic information. The characteristic information may include the size of the audience, the positions of the audience in the audience area, and other information pertaining the physical characteristics of the audience as a whole. To do so, the audience characteristic module 1030 may also optionally receive the image information to help define the spatial characteristics shown in the image.

Although the above description describes modules of a facial recognition system in accordance with an exemplary embodiment of the disclosure, other facial recognition modules that that add, combine, rearrange, and/or omit modules are possible in accordance with other embodiments.

Figure 12:
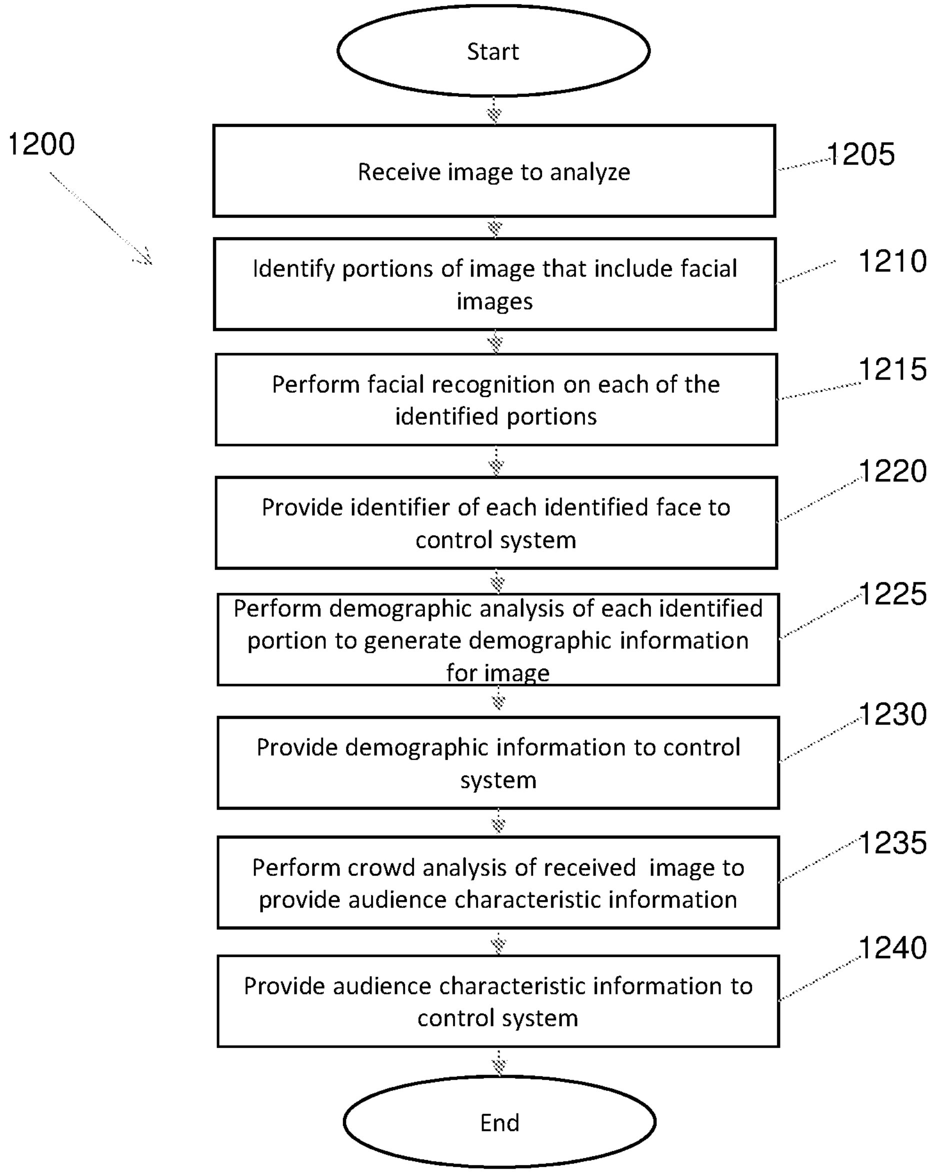
FIG. 12 is a flow diagram of a process performed by a facial recognition system to generate audience information from a captured image of an audience area in accordance with an aspect of the disclosure.

FIG. 12 illustrates a flow diagram of a process performed by a facial recognition system to perform facial recognition in a captured image of an audience area in accordance with an aspect of the disclosure. In the process 1200, an image of the audience area is received (1205). As discussed above, the received image may be processed to conform the image to the requirements of the process 1200.

Portions of the received (and optionally processed) image that include a facial image are identified (1210). As discussed above, each portion may be further processed to conform the facial image to the requirements of the facial recognition process. A facial recognition comparison to the facial images stored in the facial recognition record is performed to identify the records that match the facial images (1215). The identifiers of the matching records are provided to the content control module or device.

The information of the facial images from the captured image generated for the facial recognition comparisons is used to generate demographic information for the audience (1225). The demographic information provided is discussed above with respect to FIG. 10. The demographic information for the audience is provided to the content control nodule or device (1230).

The information of the facial images from the captured image generated for the facial recognition comparisons is also used to generate audience characteristic information (1235). The process for generating the audience characteristic information and the information generated are discussed above with reference to FIG. 10. The audience characteristic information is also provided to the content control module or device (1240), at which point the process 1200 may end.

What is claimed is:

1. An audio-visual display system for presenting audio-visual media content to an audience, the system comprising:
- a recognition module configured to detect a presence of an audience member in a venue and identify the audience member;
- a media content playback device operable to present audio-visual media content to the audience member;
- a content control module configured to control presentation of the audio-visual media content by the media content playback device, wherein the content control module is configured to execute an artificial intelligence algorithm;
- a processor in communication with the recognition module, the media content playback device, and the content control module; and
- a memory in communication with the processor and having stored therein instructions that, when read by the processor, direct the processor to:
  - receive the identity of the audience member from the recognition module;
  - receive demographic information for the audience member, wherein the demographic information is determined by the artificial intelligence algorithm;
  - determine, by the artificial intelligence algorithm executed by the content control module, media content preferences for the audience member, wherein the media content preferences for the audience member include a preference for a scientific aspect of an exhibit in the venue or a historical aspect of the exhibit in the venue, wherein the artificial intelligence algorithm includes an artificial neural network algorithm configured to take at least a portion of the determined demographic information for the audience member, including an age of the audience member, and select, based at least in part on the age of the audience member, media content directed to the scientific aspect of the exhibit or to the historical aspect of the exhibit, that will appeal to the audience member;
  - determine, by the artificial intelligence algorithm executed by the content control module, media content for the audience member, wherein determining the media content for the audience member includes considering the determined media content preferences for the audience member, and the demographic information determined by the artificial intelligence algorithm for the audience member,
  - wherein the determined media content comprises audio-visual media content directed to the scientific aspect of the exhibit or audio-visual media content directed to the historical aspect of the exhibit; and
  - operate the media content playback device to present the media content for the audience member to the audience member, wherein the presented media content includes audio-visual media content.

2. The system of claim 1, wherein the stored computer instructions are further configured to instruct the processor to determine a time allocation constraint for the audience member.

3. The system of claim 2, wherein the stored computer instructions are further configured to instruct the processor to determine the media content for the audience member based on the determined time allocation constraint for the audience member.

4. The system of claim 1, further including a proximity sensor configured to detect a location of the audience member in the venue.

5. The system of claim 1, wherein the stored computer instructions are further configured to instruct the processor to determine physical attribute information for the audience member, and wherein media content for the audience member is determined at least partially based on the physical attribute information for the audience member.

6. The system of claim 5, wherein the stored computer instructions are further configured to instruct the processor to determine personal information for the audience member, and wherein media content for the audience member is determined at least partially based on the personal information for the audience member.

7. The system of claim 6, wherein the stored computer instructions are further configured to instruct the processor to:

select playback parameters for use during playback of the media content to the audience member.

8. The system of claim 7, wherein the playback parameters include at least one of volume, foreign language, closed captioning, or specialized content for a person with a disability.

9. The system of claim 1, wherein the media content playback device is a smartphone, computer, or personal digital device.

10. The system of claim 1, wherein the recognition module is configured to wirelessly identify the audience member.

11. An audio-visual display system for presenting audio-visual media content to an audience, the system comprising:

a recognition module configured to detect a presence of an audience member in a venue and identify the audience member;

a media content playback device operable to present audio-visual media content to the audience member;

a content control module configured to control presentation of the audio-visual media content by the media content playback device, wherein the content control module is configured to execute an artificial intelligence algorithm;

a processor in communication with the recognition module, the media content playback device, and the content control module; and a memory in communication with the processor and having stored therein instructions that, when read by the processor, direct the processor to:

receive the identity of the audience member from the recognition module;

receive demographic information for the audience member, wherein the demographic information is determined by the artificial intelligence algorithm;

determine, by the content control module, media content preferences for the audience member, wherein the media content preferences for the audience member include content preferences for an exhibit in the venue, including a preference for a scientific aspect of the exhibit or a historical aspect of the exhibit, wherein the artificial intelligence algorithm includes an artificial neural network algorithm configured to take at least a portion of the determined demographic information for the audience member, including an age of the audience member, and select, based at least in part on the age of the audience member, media content directed to the scientific aspect of the exhibit or to the historical aspect of the exhibit, that will appeal to the audience member;

determine, by the artificial intelligence algorithm executed by the content control module, media content for the audience member, wherein determining the media content for the audience member includes considering the determined media content preferences for the audience member, and the demographic information determined by the artificial intelligence algorithm for the audience member, wherein the determined media content comprises audio-visual media content directed to the scientific aspect of the exhibit or audio-visual media content directed to the historical aspect of the exhibit; and operate the media content playback device to present the media content for the audience member to the audience member, wherein the presented media content includes audio-visual media content.

12. The system of claim 11, wherein the stored computer instructions are further configured to instruct the processor to determine a time allocation constraint for the audience member.

13. The system of claim 12, wherein the stored computer instructions are further configured to instruct the processor to determine the media content for the audience member based on the determined time allocation constraint for the audience member.

14. The system of claim 11, further including a proximity sensor configured to detect a location of the audience member in the venue.

15. The system of claim 11, wherein the stored computer instructions are further configured to instruct the processor to determine physical attribute information for the audience member, and wherein media content for the audience member is determined at least partially based on the physical attribute information for the audience member.

16. The system of claim 15, wherein the stored computer instructions are further configured to instruct the processor to determine personal information for the audience member, and wherein media content for the audience member is determined at least partially based on the personal information for the audience member.

17. The system of claim 16, wherein the stored computer instructions are further configured to instruct the processor to:

select playback parameters for use during playback of the media content to the audience member.

18. The system of claim 17, wherein the playback parameters include at least one of volume, foreign language, closed captioning, or specialized content for a person with a disability.

19. The system of claim 11, wherein the media content playback device is a smartphone, computer, or personal digital device.

20. The system of claim 11, wherein the recognition module is configured to wirelessly identify the audience member.

* * * * *